United States Patent [19]
Mendelsohn et al.

[11] 3,855,330
[45] Dec. 17, 1974

[54] PRODUCTION OF STYRENE

[75] Inventors: Jean Claude Mendelsohn, Sauveterre De Bearn; Jean Henri Blanc, Pau, both of France

[73] Assignee: Societe Nationale Des Petroles D'Aquitaine, Courbevoie, France

[22] Filed: Sept. 20, 1972

[21] Appl. No.: 290,440

[30] Foreign Application Priority Data
Sept. 23, 1971  France .............................. 71.34180
Sept. 8, 1972  France .............................. 72.31869

[52] U.S. Cl. .......................... 260/669 R, 23/288 R
[51] Int. Cl. ............................................. C07c 5/18
[58] Field of Search ................ 23/288 R; 260/669 R

[56] References Cited
UNITED STATES PATENTS
3,502,737  3/1970  Ghublikian et al. ............ 260/669 R
3,556,736  1/1971  Boyd ................................ 23/288 R
3,598,542  8/1971  Carson et al. ..................... 23/288 R

*Primary Examiner*—C. Davis
*Attorney, Agent, or Firm*—Ostrolenk, Faber, Gerb & Soffen

[57] ABSTRACT

Styrene is produced from ethylbenzene by contacting the ethylbenzene with a first dehydrogenation catalyst, contacting the resulting product with oxygen and an oxidation catalyst, and contacting the resulting product with a second dehydrogenation catalyst.

9 Claims, 1 Drawing Figure

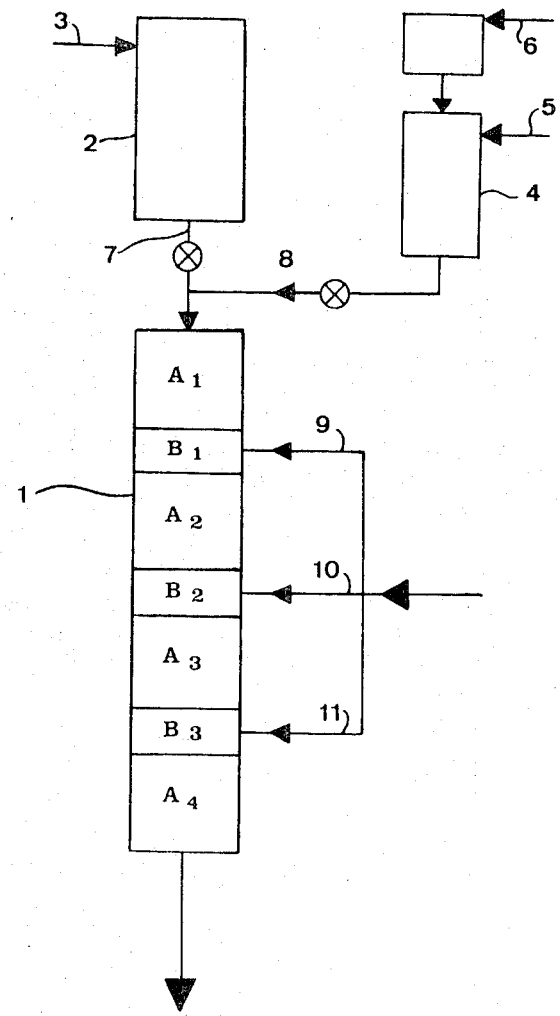

PRODUCTION OF STYRENE

The present invention relates to the production of styrene from ethylbenzene; it provides an improved process for dehydrogenating ethylbenzene into styrene and an apparatus for carrying the process into effect. The process and apparatus are also applicable to the production of substituted styrenes, which are obtained by dehydrogenation of corresponding alkyl-aryls.

The transformation of ethylbenzene into styrene is an endothermic reaction, the carrying out of which industrially in an adiabatic reactor meets the difficulty of a sufficiently economic provision of the calories necessary for pushing the transformation to the utmost extent. Since the initial reaction mixture, heated by steam injection, is cooled as the dehydrogenation of the ethylbenzene progresses, the reaction is automatically slowed down if the medium is not reheated. This is the reason why it has been necessary to use several catalytic reactors in a cascade arrangement, the effluent leaving one reactor being reheated by passing through a suitable heat exchanger before entering the following reactor.

It has been found possible to avoid this technological complication by a process which involves introducing oxygen into the reaction mixture, so as to burn the hydrogen formed by the reaction; the combustion of the hydrogen within the gaseous mixture reheats the latter, and in addition, has a favorable effect on the chemical equilibrium, displacing it in the sense of forming styrene. It is in this way that, according to U.S. Pat. No. 3,437,703, the yield of styrene is increased from 33.1% up to 51.6%, using a single reactor, by injection of air into the mixture of ethylbenzene and steam at about 600°C, passing over a dehydrogenation catalyst which is based on $Fe_2O_3$, $Cr_2O_3$ and $K_2O$, to which has been added an oxidation catalyst formed of palladium on an alumina support. Styrene yields of the order of 50 to 69% are obtained by the process of U.S. Pat. No. 3,502,737, which employs the addition of air to the reaction mixture passing over a conventional dehydrogenation catalyst consisting of oxides of Fe, Cr and K on an oxide support, such as magnesium oxide.

Despite the progress achieved by the aforesaid prior art, the problem of economic manufacture of styrene still remained; none of the known processes permitted a yield of 70% (number of moles of styrene obtained from 100 moles of ethylbenzene being used) to be reached with a single reactor, nor ensured a constant functioning of the reactor for hundreds or thousands of hours. In utilising the processes referred to above, the yields decrease with time, so that the catalyst bed is unable to function in advantageous manner for more than a few days. For a conventional dehydrogenation catalyst, capable of providing a yield of about 69% with the injection of air, the yield is only about 58% after 24 hours and scarcely exceeds 50% after an operation lasting 2 days. On the other hand, analyses of the exit gases for $CO_2$ shows a substantial combustion of the hydrocarbons of the reaction mixture in addition to the burning of the hydrogen, even when the proportion of oxygen introduced is small.

The improvement provided by the present invention resides mainly in the very substantial improvement in the yield of styrene and in the stabilization of the operation, which can be continued for months with practically constant results. The invention also makes possible practically exclusive combustion of the hydrogen formed in the reaction, without affecting the hydrocarbons which are present. On the other hand, the apparatus according to the invention, of simple and compact construction, can lead, in a single reactor, to styrene yields of more than 70%.

The process according to the invention, for the production of styrene by passing ethylbenzene vapor over a dehydrogenation catalyst and an oxidation catalyst, with introduction of oxygen into the reaction medium, is characterised in that the oxidation catalyst is disposed in a layer downstream of a dehydrogenation catalyst layer and followed by a second dehydrogenation catalyst layer, the oxygen being introduced only into the oxidation catalyst layer and not into the dehydrogenation layers.

The invention results from the discovery, which could not be foreseen from the prior art, that the presence of the oxygen in the gaseous reaction medium in course of time deactivates the dehydrogenation catalyst. Consequently, the new process unexpectedly permits the obtaining of better yields and avoids decreases in yield which are produced in time in the prior processes, as referred to above, in which the oxygen comes into contact with the dehydrogenation catalyst.

According to one preferred feature of the invention, the thickness of the oxidation catalyst layer and the supply of oxygen, or of gas containing oxygen, are regulated in such manner that the major part or all of the oxygen is consumed within this layer. In other words, the reaction medium, which reaches the second dehydrogenating layer, coming from the oxidation layer, contains very little oxygen or preferably contains practically none at all. The oxygen content, which must not be exceeded at the entry to the dehydrogenation zone, is 0.01 mole of $O_2$ per mole of ethylbenzene which is present or 0.08% of oxygen by volume of the gaseous reaction medium. The best working conditions are in the practically complete absence of oxygen in the gases leaving the oxidation catalyst layer.

According to another important feature of the invention, the oxygen is introduced into the reaction medium only when a substantial transformation of the ethylbenzene into styrene has already taken place. The introduction is generally only carried out after the transformation of about 15% of ethylbenzene into styrene and preferably when the yield of styrene has reached more than about 20%. On the other hand, it is of interest to commence the combustion of the formed hydrogen, by the injection of air, before the styrene yield has reached 50%; it is preferable to effect this injection before the transformation of 40% of the ethylbenzene into styrene or better still before or at 30% transformation.

The conditions as set forth above can be achieved by the suitable choice of the thicknesses of the catalyst layers in the reactor, for a given temperature and a given composition of the reaction mixture. Inter alia, the ratios between the thicknesses of the catalyst layers play an important part. If 1.0 is set as the standard for the thickness of the first dehydrogenation catalyst layer, it is advisable, according to the invention, to have the following layers in the following thicknesses:

First oxidation catalyst layer: 0.4 to 0.8, preferably 0.5 to 0.7;

Second dehydrogenating layer: 1.3 to 2.3, preferably 1.7 to 2.1;

Second oxidizing layer: 0.4 to 0.8, preferably 0.5 to 0.7;

Third dehydrogenating layer: 2.3 to 3.3, preferably 2.5 to 3;

Third oxidizing layer: 0.4 to 0.8, preferably 0.5 to 0.7;

Fourth dehydrogenating layer: 3.5 to 4.5, preferably 3.8 to 4.2.

If a larger number of catalytic layers is necessary, each of the dehydrogenating layers is about 1.3 to 1.6 (preferably 1.5) times thicker than the preceding dehydrogenating layer, while the oxidising layers can have thicknesses equal to or close to those of the preceding oxidising layers.

The process according to the invention can be carried out with the various catalysts which are known in the art concerned with the dehydrogenation of ethylbenzene and the combustion of hydrogen in the presence of hydrocarbons. Thus, it is possible to use for the dehydrogenation the catalysts which are sold under the names SHELL-105, CCI, C97, GIRDLER G-64 or G-84, etc., particularly those which are described in U.S. Pat. Nos. 2,408,140, 2,414,585, 2,426,829, 2,870,228, 2,945,960 and 3,084,125. As regards the oxidation of the formed hydrogen, it can, for example, be carried out by means of catalysts of the Pt or Pd type on alumina, GIRDLER G-74 and molecular screens charged with ferrous, heavy or noble metals. Thus, by using the catalysts described in U.S. Pat. No. 3,437,703, but applying the principles of the present invention, it becomes possible to obtain constant yields of 70% instead of 51%.

However, particularly good results are obtained when using, within the scope of the present invention, a special oxidation catalyst which is formed by a calcined zeolite, including reduced platinum, in the amount of 0.01 to 5% by weight of the zeolite, and preferably 0.05 to 3%. This catalyst originates from a molecular screen, of which the access to the interior cavities is about 3 to 12 A and more particularly 4 to 10 A.

As exemplified in Examples 5-9, this catalyst is prepared by contacting an aqueous solution of a platinum salt with a previously degasified zeolite containing an alkali metal or alkaline earth metal, such as Union Carbide 4A and 13X (compensation cation is sodium) or 5A (compensation cations are sodium and calcium). After a cation exchange, the zeolite is washed, dried, calcined and reduced with hydrogen.

This preferred oxidation catalyst has the unexpected property of permitting the combustion of more than 100 moles of $H_2$, or even more than 200, per mole of simultaneously burnt hydrocarbon, when only 10 to 25 moles of $H_2$ are oxidised per mole of hydrocarbon in the presence of a catalyst formed by a similar zeolite, but containing Cu instead of Pt.

The oxidation catalyst according to the invention is therefore of particular interest for carrying out the new process, because it makes possible the very strong combustion of the hydrogen which is present, with almost complete or complete disappearance of the oxygen being used in the oxidation layer. As a result, there is practically no oxygen in the reaction mixture which passes from the oxidation layer into the dehydrogenation layer which follows it. Thus, the combination by means of a zeolite layer with 0.01 to 5% by weight of reduced Pt, placed between two conventional dehydrogenation catalyst layers, particularly those of the oxides of Fe, Cr and K, constitutes a novel feature which supplies the improved industrial results set out above.

The reactor according to the invention comprises a column containing supports for the catalyst, entry pipes for air and means for distributing the air in one or more transverse planes inside the column. The top of the reactor is connected to furnaces which serve to supply the steam and ethylbenzene at the desired temperature. The top of the column contains a first dehydrogenation catalyst layer; situated downstream thereof is an oxidation catalyst layer, this being at the level at which the air inlet is connected. Following the oxidation layer, the column contains a new dehydrogenation layer.

Preferably, the succession of aforesaid layers is repeated once or several times, that is to say, an oxidation layer is placed at the bottom of a dehydrogenation layer, except at the bottom of the column, which is terminated by a dehydrogenation layer. Each of the oxidation catalyst beds contains means for the distribution of the air injected at the level of these beds.

The accompanying FIGURE shows diagrammatically an apparatus according to the invention.

In the drawing, 1 represents the column of the reactor; 2 is a furnace for heating steam from the supply 3 to the required temperature; 4 is a furnace for heating the ethylbenzene introduced by way of 5 with the steam coming from another furnace 6. The top of the column 1 is thus supplied with ethylbenzene and steam, in the required ratio, through the pipelines 7 and 8.

The dehydrogenating layers inside the column 1 are represented by the letters $A_1$, $A_2$, $A_3$, $A_4$. It is seen that an oxidation catalyst layer $B_1$ is interposed between the beds $A_1$ and $A_2$; a similar oxidising layer $B_2$ is placed between $A_2$ and $A_3$ and likewise an oxidation catalyst bed $B_3$ separates $A_3$ from $A_4$.

The reaction mixture leaving at the base of $A_4$ is directed towards conventional condensation and recovery apparatus which are not shown in the drawing.

According to the invention, oxygen or a gas containing it, generally air, is injected through the pipes 9, 10 and 11 only into the regions of the column which are provided with oxidation catalyst.

The dimensions of the layers A and B obviously vary in accordance with the operating conditions and the required production. Similarly, the number of the sections A and B can vary, the minimum being two layers A separated by a bed B. However, according to one preferred form of the invention, a certain ratio must be respected between the heights of the different layers, so as to take into account the kinetics of the reaction. Thus, each of the layers $B_1$, $B_2$ and $B_3$ preferably has a height equal to 0.4 to 0.8 or preferably 0.5 to 0.7 of the height of $A_1$. The preferred height of $A_2$ is between 1.3 and 2.3, or preferably 1.7 and 2.1, times the height of $A_1$. The heights of the layers $A_3$ and $A_4$ progressively increase: the height of $A_3$ is equal to 2.3 to 3.3, or preferably 2.5 to 3, times that of $A_1$, while the height of $A_4$ is equal to 3.5 to 4.5, or preferably 3.8 to 4.2, times the height of $A_1$.

As a non-limitative example, an apparatus comprising 7 layers, in accordance with the accompanying FIGURE, and designed for the industrial production of styrene at the rate of several tons per day has the following heights of the layers: $A_1$ 52 cm; $B_1$ 32 cm; $A_2$ 101 cm; $B_2$ 34 cm; $A_3$ 140 cm; $B_3$ 32 cm; $A_4$ 208 cm.

EXAMPLE 1

A. In an adiabatic reactor, a fixed catalyst bed is formed by a mixture of 6 parts by weight of SHELL- 105 dehydrogenation catalyst (87–90% of $Fe_2O_3$, 2–3% of $CR_2O_3$ and 8–10% of $K_2O$, in the form of cylindrical pellets with a diameter of 4.7 mm), with 1 part by weight of alumina charged with 0.1 % of palladium chloride in the form of balls with a diameter of 12 mm. A gas stream, consisting of, by weight:

62.5% of steam,
30.8% of ethylbenzene,
6.7% of air is caused to pass at 605°C through this bed, with a spatial velocity of 0.33 kg per hour, per kg of catalyst.

The gas stream is injected from the top of the catalytic charge, and also at two-thirds and one-third of the height of this charge.

After operating for 2 hours, it is found that the yield of styrene relative to the introduced ethylbenzene is 52%. The yield is 47% after 12 hours and 38% after 2 days.

B. In the same reactor, an operation is carried out at the same temperature, with the same mixture of 62.5 parts by weight of steam and 30.8 parts of ethylbenzene. However, the two catalysts, instead of being mixed, are disposed in three superposed layers: a first layer, formed by half of the SHELL-105 catalyst, a second layer of palladised alumina with a volume equal to half that of the SHELL-105 layer, and third layer formed by the second half of the SHELL catalyst.

All the ethylbenzene-steam mixture is introduced above the first catalytic layer, while the air is only injected into the palladised alumina layer.

After operating for 2 hours, the styrene yield is 58.7% relative to the initial ethylbenzene; it is 57.1% after 12 hours and 56.5% after 2 days.

Operating procedure (A) is that according to the prior art (U.S. Pat. No. 3,437,703), while procedure (B) corresponds to the process of the invention, using the same catalysts as (A). It is seen that there is a strong increase and particularly a stabilization of the yield by application of the process (B).

EXAMPLE 2

The operation (B) of Example 1 is repeated with an oxidation catalyst which is formed by a molecular screen of the calcined 4A type (zeolite with opening of cavities of 4 Angstrom) containing by weight 0.08% of platinum, 5.9% of Na and 9.5% of K, instead of the palladised alumina.

The yield after 2 hours is found to be 62%, and it is 61.7% after 2 days.

EXAMPLE 3

For clearly determining the action of the oxygen on the dehydrogenation catalyst, the following partial preparations of styrene are carried out.

A. Through the top of a reactor lined with SHELL-105 catalyst a mixture of ethylbenzene and water, in which the partial pressure of the ethylbenzene is 6%, is introduced at 582°C. The rate of flow of ethylbenzene is 0.94 mole/hour. The contact time, related to the gaseous volume under normal temperature and pressure conditions is 1 second.

After operating for 10 hours, the conversion of ethylbenzene is 32.7%.

The apparatus is permitted to function for a total of 253 hours: the same conversion of 32.7% is still found and this proves that, under the aforementioned operating conditions, the SHELL catalyst has not undergone any deactivation.

B. The reactor of (A) is permitted to continue functioning but, after the 253rd hour, 0.022 mole/h of oxygen, in the form of air, is introduced into the supply of ethylbenzene and water. After functioning for 60 hours with addition of the oxygen, the rate of conversion is no more than 3%. It is thus obvious that the oxygen deactivates the dehydrogenation catalyst.

EXAMPLE 4

A production of styrene is carried out in an apparatus such as that shown in the accompanying FIGURE.

The dehydrogenations layers $A_1$ to $A_4$ are formed by the SHELL-105 catalyst, as in Example 1; these layers have respectively the following heights: 52 — 101 — 140 — 208 cm. The oxidation catalyst beds $B_1$ $B_3$ contain grains of type 4A zeolite with 0.17% of platinum, 6.7% of sodium and 6.4% of potassium, calcined beforehand under nitrogen and then reduced by hydrogen.

As shown in the drawing, the mixture of steam and ethylbenzene arrives at the top of the layer $A_1$, while the air is distributed between the three layers $B_1$, $B_2$, $B_3$.

The partial pressure of the ethylbenzene in the injected steam is 6.2% (0.062 atm), while the air which is introduced represents 0.33 mole per mole of ethylbenzene, for each of the three oxidation layers; the total of air is thus 0.99 mole (i.e. 0.2 mole of $O_2$) per mole of ethylbenzene.

The following table indicates the conditions and results arising from the functioning of this reactor; the conversions and yields are determined at different levels of the catalytic layers.

| Levels | °C | Conv. % | Sty-rene | Ben-zene | Yield % Tol-uene | $CO_2$ |
|---|---|---|---|---|---|---|
| Inlet $A_1$ | 610 | 0 | 0 | 0 | 0 | 0 |
| outlet $A_1$ | 580 | 22 | 21 | 0.45 | 0.50 | — |
| outlet $B_1$ | 610 | 23.2 | 22 | 0.50 | 0.60 | 0.1 |
| outlet $A_2$ | 580 | 47.2 | 44 | 0.80 | 2.30 | 0.1 |
| outlet $B_2$ | 610 | 48.5 | 45 | 0.85 | 2.40 | 0.3 |
| outlet $A_3$ | 580 | 68.9 | 62 | 1.15 | 5.40 | 0.3 |
| outlet $B_3$ | 610 | 70.3 | 63 | 1.20 | 5.50 | 0.6 |
| outlet $A_4$ | 580 | 82.1 | 72.5 | 1.50 | 7.50 | 0.6 |

The judicious arrangement of the oxidation layers $B_1$ to $B_3$ has made it possible for the reaction medium to be reheated each time from 580° to 610°C, thus preventing the slowing down of the reaction. It can be established that, during the first dehydrogenation phase, in the layer $A_1$, the reheating, that is to say, the injection of air, had certainly become necessary when the ethylbenzene conversion had reached 22%; actually, as shown by the second horizontal line of the table, at this moment, the temperature has fallen to 580°C, and naturally it would have continued to fall, with slowing down of the reaction, if the reaction medium had not come into contact with the oxidation layer $B_2$.

When extending the operation to 63 days, no decrease in the styrene yield could be detected.

For illustrating the advantages of the catalysts according to the present invention, a mixture of ethylbenzene, styrene, steam, hydrogen and air at 580°C is caused to pass over the catalysts which have been studied and the gas which leaves is analysed. The proportions of ethylbenzene, on the one hand, and of styrene and hydrogen, on the other hand, are chosen so as to simulate those which occur when about 20% of ethylbenzene are converted into styrene in an industrial reactor. It is in fact known that, during the dehydrogenation of the ethylbenzene on the conventional catalysts (particularly SHELL-105), starting at 610°–620°C, the temperature falls to about 580°C when 20% of the ethylbenzene has been converted into styrene; since the reaction slows down too much for an industrial operation below 580°C, it is at the level of the reactor corresponding to this temperature which it would be appropriate to inject oxygen, if this had not previously been done.

Obviously, during the tests referred to below, the initial mixture contained as many moles of hydrogen as styrene, since the transformation of one mole of ethylbenzene into one mole of styrene liberates one mole of hydrogen.

The reactor which is used in these tests is formed by a stainless steel tube with an internal diameter of 20 mm and a total effective capacity of about 200 ml. It is heated electrically with three separate resistance windings, which keep it at a constant temperature. The top of the reactor is arranged in such a way as to permit the separate introduction of water, hydrocarbons, hydrogen and air.

At the middle of the tube, there are placed 10 ml of catalytic material held on either side by a layer consisting of grains of silicon carbide. The proportions of the materials on entering the reactor are:

| | |
|---|---|
| ethylbenzene | 0.71 mole |
| styrene | 0.18 mole |
| hydrogen | 0.18 mole |
| oxygen (in air form | variable between 0.018 and 0.105 moles |

At the same time, 15.3 moles of $H_2O$ are injected. The rates of flow are regulated so as to have the passage times which are indicated in the following examples. The introduced gases are completely free from $CO_2$; $CO_2$ is introduced in measured quantities into the gases which leave, making it possible to calculate the quantities of ethylbenzene and styrene which are burned. One mole of each of these hydrocarbons gives 8 moles of $CO_2$ if the combustion is complete.

The catalyst is kept at 580°C.

In the tables which follow, the passage time indicates, in seconds, the quotient of the volume of the catalyst bed and the rate of flow of the gas, calculated under normal temperature and pressure conditions.

One important value which characterizes the efficiency of the catalyst is the "specificity", that is to say, the selectivity of the catalyst as regards the oxidation of the hydrogen with respect to that of the hydrocarbons. This specificity expresses the ratio number of moles of oxidised $H_2$/number of moles of oxidised hydrocarbons The greater this ratio, the greater is the specificity of the catalyst.

The catalysts based on a molecular screen are prepared from the zeolites 4A, 5A and 13X of UNION CARBIDE CO.: the access to the interior cavities is respectively 4A, 5A and 10A.

The characteristics of the catalysts and of the passage times in the 12 tests, set out in the following table, are to be found hereinafter. The preparation of the catalysts VI to XI is illustrated by Examples 5 to 9; these catalysts VI to XI have all been reduced with hydrogen at about 300°C.

I — $Cu—Z_1$ represents a zeolite of type 13X charged with copper. Passage time: 0.08 second.

II — $Cu—Z_2$: zeolite of type 4A containing copper. Passage time: 0.23 second.

III — The catalyst is the Shell catalyst known as SHELL 105, i.e. 87–90% of $Fe_2O_3$, 2–3% of $Cr_2O_3$, 8–10% of $K_2O$. Passage time: 0.23 second.

IV — Pt—Al is a catalyst formed by 0.35% of platinum deposited on alumina. Passage time: 0.23 second.

V — Pt—Sp represents a catalyst formed by spinel containing 0.33% of platinum. Passage time: 0.08 second.

VI — $TM_1$ is the abbreviation of the molecular screen, type 4A, containing 0.1% of Pt and 13% of Na. Passage time: 0.23 second.

VII — The operation is carried out with the same $TM_1$ and under the same conditions as for VI, but with more oxygen at the inlet.

VIII — $TM_2$: this is the molecular screen, type 4A, containing 0.08% of Pt, 5.9% of Na and 9.5% of K. The passage time is 0.23 second.

IX — $TM_2$. Test identical with the foregoing test, except that the proportion of air at the inlet is less.

X — $TM_3$. This is a type 4A molecular screen containing 0.2% of Pt and 7% of Na. Passage time: 0.14 second.

The particular feature of this example is that the ethylbenzene is caused to pass with hydrogen and oxygen, without initially introduced styrene.

XI — $TM_4$. This is a type 5A molecular screen containing 0.05% of Pt, 2.71% of Na and 8.7% of Ca.

XII — $TM_4$. This is a catalyst identical with $TM_4$ of No. XI as regards its composition, but not reduced after calcination. The test conditions are the same as for XI.

TABLE OF THE RESULTS

| No. | Catalyst | $H_2$ outlet | $O_2$ inlet moles | $O_2$ outlet moles | $CO_2$ outlet moles | Conversion $O_2$% | Specificity |
|---|---|---|---|---|---|---|---|
| I | $Cu-Z_1$ | 0.140 | 0.045 | 0.012 | 0.013 | 73 | 24 |
| II | $Cu-Z_2$ | 0.054 | 0.018 | 0.000 | 0.0084 | 100 | 11 |
| III | Shell | 0.017 | 0.017 | 0.000 | 0.016 | 100 | 0.1 |
| IV | Pt-Al | 0.144 | 0.017 | 0.000 | 0.014 | 100 | 21 |
| V | Pt-Sp | 0.113 | 0.077 | 0.007 | 0.024 | 91 | 29 |
| VI | $TM_1$ | 0.122 | 0.046 | 0.000 | 0.008 | 100 | 58 |
| VII | $TM_1$ | 0.080 | 0.086 | 0.007 | 0.019 | 92 | 43 |
| VIII | $TM_2$ | 0.080 | 0.105 | 0.031 | 0.008 | 70 | 113 |
| IX | $TM_2$ | 0.098 | 0.046 | 0.000 | 0.004 | 100 | 196 |
| X | $TM_3$*) | 0.103 | 0.0635 | 0.0174 | 0.0035 | 73 | 165 |
| XI | $TM_4$ | 0.100 | 0.093 | 0.028 | 0.007 | 70 | 104 |
| XII | $TM_4$ | 0.078 | 0.088 | 0.008 | 0.021 | 93 | 39 |

*)Test carried out in the absence of styrene.

It can be seen that catalysts I to V, similar or close to the catalysts of the prior art, have low specificity values: they do not permit more than 29 moles of hydrogen (V) to be burnt for 1 mole of hydrocarbons. On the contrary, catalysts VI to XI according to the invention, formed by molecular screens containing platinum, having undergone a reduction, permitting specificity values which are much higher and up to about 200 (IX) are reached, representing considerable progress compared with the catalysts of the prior art. Catalyst XII, although identical with XI, but not reduced, gives much less satisfactory results.

EXAMPLE 5

Preparation of a Catalyst According to the Invention

An aqueous solution is prepared which contains 3.04 g/l of platinum in the form of ammonium chloroplatinate. 30 g of previously degasified molecular screen 13X (diameter of opening of the pores 10 A) are added to 100 ml of this solution. The compensation cation of this zeolite is sodium. It is left in contact for 192 hours. The solid is then separated from the solution, washed with distilled water and dried. It is then subjected to calcination under nitrogen at 500°C for 2 hours and then to reduction with hydrogen for 24 hours at 300°C. Analyses then show that a part of the sodium has been exchanged with platinum. The following content by weight are found:

|  | % Na | % Pt |
|---|---|---|
| initial molecular screen | 12.3 | 0 |
| calcined catalyst | 5.93 | 1.39 |
| initial solution | 0.0006 | 0.304 |
| final solution | 0.08 | 0.009 |

EXAMPLE 6

Preparation of a Catalyst

The general operating procedure is the same as in the preceding example, but the ammonium chloroplatinate solution titrates 2.8 g/l and the molecular screen being used is the 4A zeolite of UNION CARBIDE, of which the opening of the pores is 4 A.

The contact time with the solution is 240 hours and the sequence of operations is the same as previously.

The content by weight of Na and Pt are:

|  | % Na | % Pt |
|---|---|---|
| initial molecular screen | 14.00 | 0 |
| calcined catalyst | 12.9 | 0.6 |

EXAMPLE 7

Preparation of the Catalyst VI (TM$_1$)

The preparation is carried out as in Example 5, except that the molecular screen being used is of the 4A type, with the opening diameter of the pores 4 A; the compensation cation is sodium. Furthermore, the contact between the solution and the zeolite is 240 hours. The analyses indicate:

|  | % Na | % Pt |
|---|---|---|
| initial molecular screen | 14 | 0 |
| calcined catalyst | 13 | 0.1 |

EXAMPLE 8

Preparation of the Catalyst VIII (TM$_2$)

100 g of molecular screen 4A, identical with that of Example 5 and 60 ml of a 100 g/l potassium chloride solution are combined at normal temperature; the contact time is 170 hours. The result is a cationic exchange, which leads to a molecular screen containing 5.96% of sodium and 9.54% of potassium. This screen is then brought into contact with 200 ml of a 10 g/l ammonium chloroplatinate solution for 240 hours. The sequence of operations is the same as previously.

The calcined cation then contains:

5.9% of Na, 9.5% of K, 0.08% of Pt.

EXAMPLE 9

Preparation of the Catalyst XI (TM$_4$)

The general working procedure is the same as in Examples 5 to 7, but the ammonium chloroplatinate solution titrates 2.8 g/l and the molecular screen being used is the type 5A zeolite of UNION CARBIDE, of which the opening of the pores is 5 A. The compensation cations of this zeolite are sodium and calcium. The contact time with the solution is 192 hours and the sequence of operations is the same as previously.

The calcined catalyst contains, by weight, 2.71% of Na, 8.7% of Ca and 0.05% of Pt.

The reduction by hydrogenation of the catalysts according to the invention can be effected between 250° and 350°C and preferably in the region of or at 300°C, as shown in Example 5; the most advantageous reduction temperature is from 280° to 320°C.

What is claimed is:

1. In a process for the production of styrene by contacting gaseous ethylbenzene with a dehydrogenation catalyst selected from the group consisting of iron oxide; cobalt oxide; mixture of iron oxide or cobalt oxide with an alkaline compound of potassium or chromium oxide; mixture of iron oxide with an alkali metal oxide; mixture of iron oxide with an alkali metal oxide and chromium oxide; mixture of iron oxide, chromium oxide, potassium carbonate and a phosphate of an alkali metal or alkaline earth metal; mixture of iron oxide, zinc oxide or magnesium oxide with chromium or copper salt and potassium oxide or potassium carbonate; mixture of iron oxide, zinc oxide or magnesium oxide with a chromium or copper salt, and potassium oxide or potassium carbonate, and a vanadium compound and an oxidation catalyst selected from the group consisting of palladium, platinum, mixture of palladium and platinum, salts of palladium and platinum, and oxides of palladium and platinum, and introducing oxygen into the reaction medium, the improvement which comprises disposing the oxidation catalyst in a zone between zones containing the dehydrogenation catalyst, and introducing oxygen only into the oxidation catalyst zone.

2. The process of claim 1 wherein the major part of the oxygen is consumed within the oxidation catalyst zone.

3. The process of claim 2 wherein the oxygen content at the inlet of the dehydrogenation zone downstream of the oxidation catalyst zone does not exceed 0.01 mole per mole of ethylbenzene which is present.

4. The process of claim 1 wherein at least about 15% of the ethylbenzene has been transformed into styrene before the reaction medium is introduced into the oxidation catalyst zone.

5. The process of claim 1 wherein the reaction medium is introduced into the oxidation catalyst zone before the yield of styrene is 50%.

6. The process of claim 1 wherein the thickness of the oxidation catalyst zone is about 0.4 to 0.8 of the thickness of the initial dehydrogenation zone.

7. The process of claim 1 wherein each successive dehydrogenation catalyst zone is about 1.3 to 1.6 times thicker than the preceding dehydrogenation catalyst zone.

8. The process of claim 1 wherein the thickness of the oxidation catalyst zone is 0.5 to 0.7 times the thickness of the initial dehydrogenation catalyst zone, each successive dehydrogenation catalyst zone is 1.5 times thicker than the preceding dehydrogenation catalyst zone, the oxygen content at the inlet of the dehydrogenation catalyst zone downstream of the oxidation catalyst zone does not exceed 0.01 mole per mole of ethylbenzene which is present, at least about 20% of the ethylbenzene has been transformed into styrene when the reaction medium is introduced into the oxidation catalyst zone and the yield of styrene is less than 30% when the reaction medium is introduced into the oxidation catalyst zone.

9. The process of claim 1 wherein the dehydrogenation catalyst is a mixture of iron, chromium and potassium oxide and wherein the oxidation catalyst is a calcined zeolite containing reduced platinum.

* * * * *